Patented Aug. 15, 1933

1,922,096

UNITED STATES PATENT OFFICE 1,922,096

METHOD OF PREPARING YEAST RAISED DOUGH FOR BAKING

Henry Jung, Hines, Ill.

No Drawing. Application June 22, 1931
Serial No. 546,160

4 Claims. (Cl. 99—10)

My invention is concerned with bread dough conditioning or pannery fermentation, and it is designed to do away with certain objections that are found to exist in the methods or processes heretofore commercially employed, and with which I am familiar, which methods are known as (1) sponge; (2) straight; and (3) soaker. It is now quite a universal practice to use various combinations of yeast stimulating salts, and it is one of the objects of my invention to dispense with these added mineral salts as sufficient such salts are naturally contributed by the major materials, such as flour, water, yeast and sugars.

The primary principle in any bread method for leavened bread should be that of developing a degree of elasticity to enable the dough to distend itself freely as the accumulation of carbon dioxide gas progresses inside of the dough, thus effecting its most perfect rising before and after it reaches the oven. This elasticity is developed by the presence of water to soften the gluten as an initial circumstance, and by gentle stretching as a consequence of the yeast action.

However, it is my contention that this primary or natural principle is in the present art so misunderstood that it has always caused, and still is causing, all of the difficulties in obtaining the desired and uniform characteristics in the finished product. The exponents of the soaker method, in advocating the use of mineral salts, and permitting the addition of flour to an already soaked portion, show that they have not observed the complete elastication of the gluten as a solution of all difficulties, and the possible elimination of all so-called "improvers."

My reasons for dispensing with the mineral salts are that these so energize the yeast as to shorten its life, necessitating early panning of the dough, thus depriving the gluten of that much more time which it could otherwise use for softening. It is the insufficient softening of this gluten that is the disturbing circumstance causing so much difficulty and imperfection in the finished product. Until this gluten has reached its complete flexibility it can not lend itself easily and uniformly to accomplish any desired characteristic in the finished product. And, normal fermentation at best is not sufficiently long, nor sufficiently beneficial to accommodate the gluten in the time it requires for its complete elastication. It is also reasonable to suppose that any insufficiently softened gluten diminishes the digestibility of the bread. In the case of hardest wheat this requires at least seven hours, while maximum time for yeast action is three to four.

The steps of the "sponge" dough method are that of first setting a batch of flour, water and yeast, and after the time required for it to rise and fall at least once, the remainder of the flour, water and other ingredients is added, after which the dough continues to ferment until it suits the workman for panning. It is apparent here that there are two divisions of flour with vastly different degrees of elasticity, as well as two quite different divisions of yeast sporation, both of which differences are naturally unfavorable.

The steps of the "straight" dough method are that of incorporating all the ingredients in the mixing operation, and, after placing it to rise, it is from time to time turned or kneaded to agitate the moistened gluten so as to aid softening until the dough has acquired an age and condition satisfactory to the workman for the desired type of bread intended. It is apparent that this method entails uncertainties, irregularities and variations, and does not permit sufficient time to completely soften the gluten, while fermentation is unfavorably prolonged.

The steps of the "soaker" dough method are, primarily, that of allowing a portion or all of the flour to rest in soak to acquire the desired elasticity before adding any yeast, after which the aging or fermentation period begins. This method necessitates much more time from the first mixing of the "soaker" to the final maturity of the finished dough, and this circumstance exposes the dough too dangerously to putrefactive organisms and bacteria. This method also is objectionable in that it is laborious to transfer by hand this lifeless "soaker" into the mixer (with its dead weight), and the additional laborious feat of thoroughly incorporating the yeast, and perhaps additional flour, into this already toughened mass, and this may result in overworking of the dough under certain conditions.

It is a well known fact that frequently sourness and disagreeable odors occur in bread which is the result of putrefaction action, and this putrefactive action progresses chiefly before the yeast attains sufficient vigor to counteract it, and again after the yeast ceases its most vigorous activity. This is explained by the fact that yeast action in bread dough is a fermentation producing alcohol and other products, which have a preservative influence by arresting or retarding the action of other and weaker foreign and destructive ferments which are ever ready to work when permitted. These undesirable fermentations are the activities of "wild yeasts" which enter the dough during mixing, and which are sometimes contained in waters. Still other organisms contained in the flour, such as Bacteria Termo, Subtillis, and the Vibrios, immediately upon becoming moist begin to break up the proteids of the flour, causing putrefactive conditions.

It is the foremost object of this process to combat, arrest or retard the activity of these undesirable organisms and bacteria by employing low temperature, alcoholic fermentation, oversalting, and exclusion of air.

A second object is safely to allow sufficient time to permit advantageous soaking of the gluten in combination with the yeast by the use of an abnormally low temperature, and by the use of an unusual amount of common salt, under which two conditions both the desirable and undesirable ferments are held in check, and the resultant bread flavor improved.

A third object is simultaneously to start off the conditioning influences of both the moisture and yeast together with all the other ingredients, which also have an auxiliary benefit to the conditioning and flavoring.

Summarily, the complete softening of the gluten, making possible the most efficient and rapid yeast action, while on the whole effecting a minimum time for conditioning, and all the while guarding against undesirable ferments, constitute the improvements embodied in my invention.

In carrying out my method in the preferred way, I mix two batches of dough of substantially the same size, and together containing all the ingredients of the finished dough. The one, to be held at or below a temperature effective in checking yeast activity, i. e., 60° Fahrenheit or under, contains no salt. The other, to be held at a correspondingly warm temperature up to 100° Fahrenheit (so that when these doughs are combined in a later mixing they will average a normal temperature favorable to pannery fermentation, 70 to 80° Fahrenheit, according to local conditions), contains all of the salt necessary for the two combined. As it is known that salt in any excess quantity checks the action of the yeast, it will be apparent that both of these doughs, while held separate, arrest or retard fermentations of any kind, thus giving the glutinous element of the flour a chance to soak advantageously as long as may be necessary without any injurious fermentation, and to be subjected to the beneficial action of the yeast at an early stage. The other enriching ingredients, such as sugars and fats, may be equally or unequally mixed in the two batches of dough to suit the baker.

These two batches of dough may at any time that suits the baker be combined into one batch by mixing together, and such time will correspond to the requirements of the particular bread desired. The two batches of dough while separated may lie from one to several hours according to favorable or unfavorable shop conditions and materials. And when combined it may lie from one hour to as many as are needed to obtain the desired characteristics of the finished product, particularly with reference to volume and texture.

Execution of this process with reference to the two different temperatures is easily accomplished by using cold brine jacketed mixers running at low speed for the cold batch, and by using them with the brine shut off for the warm batch at whatever speed may be necessary to secure the desired temperature, as high speed, if allowed, will overheat any dough quickly without cold-brine circulation. Thermometers are attached to the mixers to determine the temperature of their contents.

The two preliminary batches of dough in their checked state not being allowed to rise beyond what would be considered a light sporation of yeast, may be snugly covered, thus protecting it from any wild yeasts in the air.

This process permits of adding any amount of bread materials commonly used at the time of final mixing of the two preliminary batches for the purpose of enlarging the quantity of dough, and for the purpose of enriching the dough to conform to the requirements of sweeter or richer types of bread and rolls, and further for the purpose of adjusting the final dough to any emergency that might arise, such as temperature of stiffness, or slackness.

What I claim as new, and desire to secure by Letters Patent of the United States, is:

1. The process of preparing yeast-raised dough for baking which consists in (1) mixing a batch of dough omitting the customary salt; (2) mixing a second batch of dough containing an excess of salt, the two batches when combined containing all desired ingredients in the proper proportions; (3) holding the saltless batch at too low a temperature to allow the yeast to ferment until the gluten content has been advantageously softened; (4) holding the salty batch until its gluten content has been advantageously softened; (5) thoroughly mixing the two batches together and bringing them to the proper temperature for yeast fermentation; and (6) allowing the dough to rise.

2. The process of preparing yeast-raised dough for baking which consists in: (1) mixing a batch of dough omitting the customary salt; (2) mixing a second batch of dough containing an excess of salt, the two batches when combined containing all desired ingredients in the proper proportions; (3) holding the saltless batch at too low a temperature to allow the yeast to ferment until the gluten content has been advantageously softened; (4) holding the salty batch at a temperature enough higher than that proper for fermentation so that when the two batches are finally mixed, their combined temperature will be that proper for yeast fermentation, and until its gluten content has been advantageously softened; (5) thoroughly mixing the two batches together; and (6) allowing the dough to rise.

3. The process of preparing yeast-raised dough for baking which consists in: (1) mixing a batch of dough omitting the customary salt; (2) mixing a second batch of the same size containing twice the customary amount of salt, the two batches when combined containing all desired ingredients in the proper proportions; (3) holding the saltless batch at too low a temperature to allow the yeast to ferment until the gluten content has been advantageously softened; (4) holding the salty batch until its gluten content has been advantageously softened; (5) thoroughly mixing the two batches together and bringing them to the proper temperature for yeast fermentation; and (6) allowing the dough to rise.

4. The process of preparing yeast-raised dough for baking which consists in (1) mixing a batch of dough omitting the customary salt; (2) mixing a second batch of the same size containing twice the customary amount of salt, the two batches when combined containing all desired ingredients in the proper proportions; (3) holding the saltless batch at a temperature of 60° Fahrenheit or under until its gluten content has been advantageously softened; (4) holding the salty batch at 90° Fahrenheit or over until its gluten content has been advantageously softened; (5) thoroughly mixing the two batches together, thereby bringing them to the proper temperature for yeast fermentation; and (6) allowing the dough to rise.

HENRY JUNG.